Nov. 17, 1953   S. F. CONKLE   2,659,144
CULINARY DEVICE
Filed Dec. 2, 1950
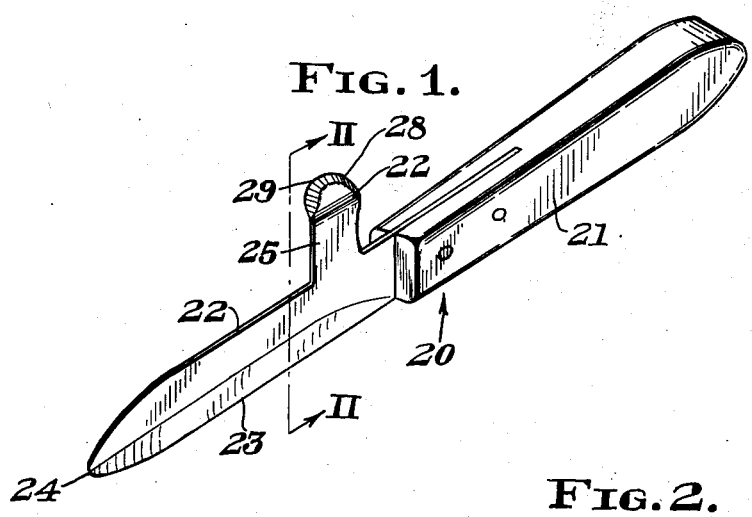
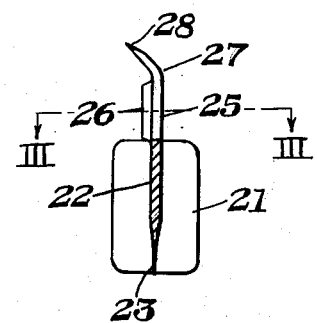
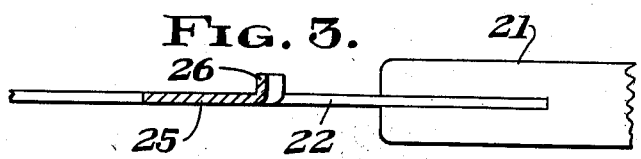
INVENTOR.
Samuel F. Conkle
BY
Herschel C. Omohundro
Attorney Patented Nov. 17, 1953

2,659,144

UNITED STATES PATENT OFFICE 2,659,144

CULINARY DEVICE

Samuel F. Conkle, Columbus, Ohio

Application December 2, 1950, Serial No. 198,843

2 Claims. (Cl. 30—353)

This invention relates generally to cutlery and is more particularly directed to an instrument which is peculiarly adapted for use in removing blemishes from articles of food such as eyes from potatoes, stems from tomatoes, mangoes and apples and skin from localized depressed portions of the surface of food.

An object of this invention is to provide a common culinary article with an additional portion which will expedite the removal of eyes from potatoes, specks and stems from mangoes, apples, tomatoes, cucumbers and like foods during the preparation thereof for consumption.

A more specific object of the invention is to provide a paring knife with a laterally extending projection which terminates in a gouge-shaped extremity designed to enter a depression, such as an eye of a potato, and remove the skin and the eye therefrom with a minimum waste of surrounding material.

Another object of the invention is to provide an article of kitchen hardware having a handle with a thin strip-like portion projecting axially therefrom and a lateral projection extending from the striplike portion, the lateral projection being bent adjacent its outer end to provide an angular portion, which is curved or substantially semi-circular at the outer end and sharpened at the edge to form a gouge-like shape, this shape being useful in scraping the skin and depressed blemishes from vegetables and fruits.

Still another object of the invention is to provide a paring knife having a handle and a striplike blade projecting axially therefrom, the blade having a projection on the back spaced slightly from the handle, the projection serving as a stop for the fingers of the user to prevent his or her hand from slipping forwardly on the handle across the sharpened blade, the projection also serving as a support for a rounded angularly extending sharpened point which may be utilized in conjunction with the blade to scrape eyes and skin from depressions in the surfaces of potatoes and other vegetables, thus conserving the time of the user and saving the surrounding portion of the vegetable, the amount thereof being removed being maintained at a minimum without effort on the part of the user.

Other objects and advantages will be apparent from the following description, reference being had to the accompanying drawing wherein a preferred form of embodiment of the invention is clearly shown.

In the drawings:

Fig. 1 is a perspective view of an article of cutlery formed in accordance with the present invention;

Fig. 2 is a vertical transverse sectional view taken through the article shown in Fig. 1 on the plane indicated by the line II—II;

Fig. 3 is a detail horizontal sectional view taken through the article on the plane indicated by the line III—III of Fig. 2.

Referring more particularly to the drawing, the numeral 20 designates a complete article of cutlery selected to illustrate the invention. The article 20 comprises a substantially conventional paring knife having a handle 21 and a flat metallic blade 22 projecting from the forward end of the handle; the blade being disposed in alignment with the axial center line of the handle. The blade 22 is shaped in one of the usual forms and is sharpened along one edge 23 from the handle 21 to the point 24.

In accordance with the invention, the blade 22 is modified by the inclusion of a projection 25 which extends upwardly from the back edge of the blade 22 in the plane thereof. The projection 25 is spaced a short distance from the front end of the handle and has the edge nearest thereto provided with a laterally bent flange 26. This flange is curved in a vertical direction, when the knife is viewed as in Fig. 1, to more closely fit the first finger of the user and prevent irritation or injury thereto when the blade of the knife is being used in a conventional manner.

At a slight distance from the back edges of the blade 22 the projection 25 is bent, as at 27, to extend angularly to the left when the knife is viewed from the point end of the blade and the back edge is upward. The end of the projection is rounded almost semicircularly and the upper or outer edge is ground as at 28 to make a sharpened, rounded point 29. This sharpened rounded point might be further shaped if so desired by making the same concave on the under side to provide a scoop effect although the form shown has been found to give entirely satisfactory results.

In the use of the device shown a potato or other item of food may be pared to remove the major portion of the skin in the usual way. Then the knife 20 is turned over in the user's hand to extend the projection 25 downwardly and the skin removed from the depressed portions such as around the eyes of the potato by inserting end 29 of the projection 25 thereinto and scraping. This method of peeling removes the skin and eye from the depressed portion with the loss of a minimum of the body of the potato. This minimum loss is in marked contrast to the loss sustained when the eyes of the potato are cut out with the point of the blade in the usual manner. The use of the device, therefore, results in a conservation of food and time as well, since the eye and the skin around it can be removed quickly and without effort.

The rounded end 29 is also useful in removing the stems, and skin from the depressed portion surrounding the same, of mangoes, apples, tomatoes, and similar food items. It is also handy in removing skin from longitudinally extending depressed portions of cucumbers and circumferentially extending grooves in squashes and pumpkins. In all these uses and many others the skin is removed in thin layers with the removal of a minimum of useful meat or flesh from the article.

It should be obvious that although the projection is illustrated as being formed from the same piece of material as the blade 22, it could be formed from a separate piece of material and welded or otherwise attached thereto without affecting the function of the device.

While but a single simple form of the invention has been shown and described it is obvious that many minor changes in the construction and relation of the parts might be made without departing from the spirit and scope of the invention as set forth in the following claims.

I claim:

1. A culinary device comprising a handle; a flat blade projecting axially from said handle, said blade having one longitudinal edge sharpened; a member projecting from the opposite longitudinal edge substantially in the plane of said blade; and an extension on said member lying in a plane at an obtuse angle to said member, which plane extends parallel to the longitudinal axis of said blade; and a sharpened arcuate edge on the outer end of said extension.

2. A culinary device comprising a handle; a flat blade projecting axially from said handle, said blade having one longitudinal edge sharpened; a member projecting from the opposite longitudinal edge of said blade adjacent said handle, said member being substantially in the plane of said blade, the edge of said member nearest said handle being arcuately recessed; a flange projecting from said member along said recess; and an extension projecting at an obtuse angle from said member at its end, said extension having an arcuate sharpened end.

SAMUEL F. CONKLE.

References Cited in the file of this patent

UNITED STATES PATENTS

| Number | Name | Date |
|---|---|---|
| D. 25,047 | Collins | Jan. 14, 1896 |
| D. 34,565 | Demarest | May 28, 1901 |
| 934,840 | Ross | Sept. 21, 1909 |
| 1,630,186 | Kelly | May 24, 1927 |
| 1,656,404 | Van Cleef | Jan. 17, 1928 |
| 1,667,596 | Kapota | Apr. 24, 1928 |
| 2,549,326 | Moore | Apr. 17, 1951 |